United States Patent

Mercx et al.

[11] Patent Number: 5,866,644
[45] Date of Patent: Feb. 2, 1999

[54] COMPOSITION FOR LASER MARKING

[75] Inventors: Franciscus Petrus Maria Mercx, Bergen op Zoom; Chris van der Weele, Sommelsdijk; Yvonne Flohil-Janse, Renesse, all of Netherlands

[73] Assignee: General Electric Company, Pittsfield, Mass.

[21] Appl. No.: 819,647

[22] Filed: Mar. 17, 1997

[51] Int. Cl.$^6$ ....................................... C08K 3/32
[52] U.S. Cl. ................ 524/417; 430/945; 524/449; 524/494
[58] Field of Search ................ 524/449, 417, 524/494, 413; 430/945

[56] References Cited

U.S. PATENT DOCUMENTS

| | | | |
|---|---|---|---|
| 4,595,647 | 6/1986 | Spanjer | 427/53.1 |
| 4,636,544 | 1/1987 | Hepp | 524/411 |
| 4,959,406 | 9/1990 | Foltin et al. | 524/413 |
| 4,972,015 | 11/1990 | Carico et al. | 524/417 |
| 5,053,440 | 10/1991 | Schueler et al. | 524/413 |
| 5,063,137 | 11/1991 | Kiyonari et al. | 524/417 |
| 5,350,792 | 9/1994 | Hess et al. | 524/417 |
| 5,367,011 | 11/1994 | Walsh | 524/417 |
| 5,441,997 | 8/1995 | Walsh et al. | 524/151 |
| 5,489,639 | 2/1996 | Faber et al. | 524/417 |
| 5,496,880 | 3/1996 | Heuseveldt et al. | 524/417 |
| 5,599,869 | 2/1997 | Kurz | 524/417 |

FOREIGN PATENT DOCUMENTS

| | | |
|---|---|---|
| 0111 357 B2 | 6/1990 | European Pat. Off. . |
| 0 675 001 A1 | 3/1994 | European Pat. Off. . |
| 0 669 365 A1 | 2/1995 | European Pat. Off. . |
| 2107322 | 9/1981 | United Kingdom . |

OTHER PUBLICATIONS

T. Kilp, Laser Marking of Plastics', Annu. Tech. Conf. Soc. Plast. Eng. (1991), 49$^{th}$, 1901–1903.

*Primary Examiner*—Veronica P. Hoke

[57] ABSTRACT

A resin composition having laser marking properties with the $CO_2$ laser with radiation at 10600 nm comprises a polyester thermoplastic resin, a sufficient amount of dark pigment for forming a dark background coloration, a mica material for absorbing said laser radiation, and an effective amount of a hydrated metal phosphate containing water of crystallization wherein said metal phosphate decomposes in laser struck areas to release said hydrated water whereby light colored markings in laser struck areas are obtained on said dark background coloration.

12 Claims, No Drawings

COMPOSITION FOR LASER MARKING

FIELD OF THE INVENTION

This invention relates to a resin composition suitable for marking with a laser and a method for laser marking.

BACKGROUND OF THE INVENTION

The laser beam provides a means of writing, bar coding and decorative marking of plastics. This technique is advantageous over current printing technologies because of the ease at which the layout can be adjusted using graphic computer programs and also integrated into the production line. Laser marking enables a contract-free procedure even on soft, irregular surfaces that are not readily accessible. In addition it is ink-free which makes it long-lasting and solvent-free and, thus, more friendly to the environment. Speeds up to 10,000 mm/sec are possible with a $CO_2$ laser while Nd-YAG laser allows up to 2000 mm/sec. Two-color injection molding offers marking results with the best contrast but the method is not flexible to change of layout. Thus, laser marking offers a versatile solution to most printing needs.

There are several laser types available for marking plastic surfaces. The Excimer laser with the frequency in the range of 196–351 nm leads to the marking of plastic surfaces by photochemical ablation or reaction. Using Nd-YAG laser at lower power levels at 532 nm provides laser marking by leaching or selective bleaching of dyes and pigments while the YAG laser at 1064 nm leads to laser marking by sublimation, discoloration, foaming and engraving. The $CO_2$ laser at 10600 nm enables laser marking by thermochemical reaction, melting, vaporizing and engraving.

In laser marking carbon black has been used to get a light contrast. Carbon black decomposes into volatile components after absorbing the laser light. These volatile components foam the surface leading to scattering of light and thus a light impression. EP 0 675 001 to Kato describes the use of zinc borate as a contrast enhancing additive. Zinc borate releases its water. U.S. Pat. No. 4,595,647 to Spanjer describes a laser markable material useful for encapsulation of electronic devices is obtained by adding $TiO_2$ or $TiO_2$+$CrO_3$ to common plastic encapsulants formed from a mixture of a resin+filler+carbon black+mold release agent. When irradiated by a $CO_2$ laser, the originally grey material turns bright gold, providing a high contrast durable mark. Desirable concentrations are described, in weight percent of the compound, as 1–5% $TiO_2$ and 0–3% $CrO_3$, with 1–3% $TiO_2$ and 0.5–2% $CrO_3$ being preferred. Carbon black is optional but a concentration in the range 0.1–3% by weight is desirable with 0.5–1% preferred.

GB 2,107,322 describes the marking of polymers which have low absorption in the infra-red range of wavelengths using a CO2 laser beam. A silicate additive is described which has a high absorption at the wavelength 10.6$\mu$. The additives are described as calcium silicate, which in the form of wollastonite has an absorption of 96% at a wavelength of 10.6$\mu$. Other silicates described include aluminum silicates, e.g. in the form of China clay. The resin material described refer to polyolefins, polystyrene, and acrylonitrile-butadiene-styrene type materials.

Other references to silicates are found in EP 0 669 365 which describes the addition of silicates to polyolefins to yield a dark brown or black marking in the laser struck areas. Similarly, EP 0 111 357 uses metal silicates to obtain black markings on articles having a polyolefin surface. T. Kilp, "Laser marking of Plastics", Annu. Tech. Conf. Soc. Plast. Eng, (1991), 49$^{th}$, 1901–1903, describes the effects of different silicates on the laser marking of polyolefins. Kaolin gave white marks on colored substrates while black marks were obtained when mica or titanium dioxide were incorporated into the substrate.

It is desirable to make further improvements in laser marking materials of the polyester type. In particular, a desired color combination is a dark background color and a light contrast color in the laser treated areas. It is desired to achieve this improvement with $CO_2$ laser at 10600 nm.

SUMMARY OF THE INVENTION

Hence, the object act of this invention is to provide polyester resin compositions containing ingredients selected to enhance the laser marking of resins with the $CO_2$ laser at 10600 nm so dark background coloration can be achieved with distinct and secure light colored markings in the laser treated areas.

According to the present invention, a resin composition having laser marking properties with the $CO_2$ laser with radiation at 10600 nm comprises a polyester thermoplastic resin, a sufficient amount of dark pigment for forming a dark background coloration, a mica material for absorbing said laser radiation, and an effective amount of hydrated metal phosphate wherein said metal phosphate decomposes in laser struck areas to release said hydrated water whereby light colored markings in laser struck areas are obtained on said dark background coloration.

DETAILED DESCRIPTION OF THE PREFERRED EMBODIMENTS

The visibility of the laser markings can be enhanced by covering the surface of an encapsulated device with a coating of contrasting color. The laser locally vaporizes the surface coat allowing the contrasting body color to show through. This provides good contrast and generally durable markings. However, additional manufacturing cost is required to apply the surface coating. It is highly desirable to be able to use a markable compound which will give durable high contrast markings without any need for a supplementary surface coating.

According to the principles of the present invention, there is provided an effective amount mica and a hydrated metal wherein said hydrated metal phosphate decomposes in laser struck areas to release water whereby light colored markings in laser struck areas are obtained on said dark background coloration.

Mica is utilized in a amount from about 1 to about 5 percent, preferably from 2 to 4 percent by weight based on the total weight of the composition. Mica is a complex potassium aluminum silicate with a density of about 2.8 g/cm3, a Mohs hardness of 2.5 to 4 and oil absorption values of 48 to 500 grams per 100 grams of powder. The lamellar reinforcement mica is obtained from the minerals muscovite, $K_2Al_4(Al_2Si_6O_2)(OH)_4$, or phogopite, $K_2(MgFe2+)6(Al_2Si_6O_2)(OH)_4$.

The hydrated metal phosphate is a crystalline substance containing one or more molecules of water of crystallization capable of giving up its water of crystallization in the laser struck areas. Zinc phosphate containing water of crystallization which has the general formula $Zn_3(PO_4)_2 \cdot 2H_2O$ is preferred and also useful in the compositions of containing polyester and polycarbonate to inhibit transesterification. Zinc phosphate is used in an amount that promotes a foaming effect in laser struck areas, preferred amounts are from about 0.2 to about 4.0 percent, preferably from about 0.4 to about 2.0 percent by weight based on the total weight of the composition. The combination of mica and zinc phosphate results in the decomposition of the zinc phosphate in laser struck areas to release said water of crystallization whereby light colored markings in laser struck areas are obtained on said dark background coloration.

Additionally the resin contains a sufficient amount of dark pigment for forming a dark background coloration. This pigmentation can be in the form of various pigments and dyes such as set forth in the examples that are compatible with the resin. Pigments are generally present in an amount from 0.01 to 4 percent by weight.

Polyesters include those comprising structural units of the following formula:

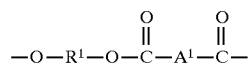

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof. Examples of suitable polyesters containing the structure of the above formula are poly(alkylene dicarboxylates), liquid crystalline polyesters, and polyester copolymers. It is also possible to use a branched polyester in which a branching agent, for example, a glycol having three or more hydroxyl groups or a trifunctional or multifunctional carboxylic acid has been incorporated. Furthermore, it is sometimes desirable to have various concentrations of acid and hydroxyl end groups on the polyester, depending on the ultimate end-use of the composition.

The $R^1$ radical may be, for example, a $C_{2-10}$ alkylene radical, a $C_{6-12}$ alicyclic radical, a $C_{6-20}$ aromatic radical or a polyoxyalkylene radical in which the alkylene groups contain about 2–6 and most often 2 or 4 carbon atoms. The $A^1$ radical in the above formula is most often p- or m-phenylene, a cycloaliphatic or a mixture thereof. This class of polyester includes the poly(alkylene terephthalates). Such polyesters are known in the art as illustrated by the following patents, which are incorporated herein by reference.

| | | | |
|---|---|---|---|
| 2,465,319 | 2,720,502 | 2,727,881 | 2,822,348 |
| 3,047,539 | 3,671,487 | 3,953,394 | 4,128,526 |

Examples of aromatic dicarboxylic acids represented by the dicarboxylated residue $A^1$ are isophthalic or terephthalic acid, 1,2-di(p-carboxyphenyl)ethane, 4,4'-dicarboxydiphenyl ether, 4,4' bisbenzoic acid and mixtures thereof. Acids containing fused rings can also be present, such as in 1,4- 1,5- or 2,6-naphthalenedicarboxylic acids. The preferred dicarboxylic acids are terephthalic acid, isophthalic acid, naphthalene dicarboxylic acid, cyclohexane dicarboxylic acid or mixtures thereof.

The most preferred polyesters are poly(ethylene terephthalate) ("PET"), and poly(1,4-butylene terephthalate), ("PBT"), poly(ethylene naphthanoate) ("PEN"), poly(butylene naphthanoate), ("PBN") and (polypropylene terephthalate) ("PPT"), and mixtures thereof.

Also contemplated herein are the above polyesters with minor amounts, e.g., from about 0.5 to about 5 percent by weight, of units derived from aliphatic acid and/or aliphatic polyols to form copolyesters. The aliphatic polyols include glycols, such as poly(ethylene glycol) or poly(butylene glycol). Such polyesters can be made following the teachings of, for example, U.S. Pat. Nos. 2,465,319 and 3,047,539.

The preferred poly(1,4-butylene terephthalate) resin used in this invention is one obtained by polymerizing a glycol component at least 70 mol %, preferably at least 80 mol %, of which consists of tetramethylene glycol and an acid or ester component at least 70 mol %, preferably at least 80 mol %, of which consists of terephthalic acid, and polyester-forming derivatives therefore.

The polyesters used herein have an intrinsic viscosity of from about 0.4 to about 2.0 dl/g as measured in a 60:40 phenol/tetrachloroethane mixture or similar solvent at 23°–30° C. Preferably the intrinsic viscosity is 1.1 to 1.4 dl/g. VALOX Registered TM 315 polyester is particularly suitable for this invention.

From the above description, it is apparent that, according to the present invention, compositions which contain laser marking additives form more distinct marks by means of laser light irradiation than in the case of compositions containing just one or neither of these.

Additionally, the preferred resin compositions of the present invention include reinforcing glass fibers. The fibrous glass comprises from 5 to 40 weight percent, preferably from about 10 to about 30 percent by weight based on the total weight. The glass fiber or filamentous glass is desirable employed as reinforcement in the present compositions. Glass that is relatively soda free is preferred. The low soda glass known as "C" glass may be utilized. For electrical uses, fibrous glass filaments comprised of lime-aluminum borosilicate glass that is relatively soda-free which is known as "E" glass may be used. The filaments are made by standard processes, e.g., by steam or air blowing, flame blowing and mechanical pulling. The preferred filaments for plastic reinforcement are made by mechanical pulling. The filament diameters range from about 3 to 30 microns inch but this is not critical to the present invention.

In preparing the molding compositions it is convenient to use the filamentous glass in the form of chopped strands of from about ⅛" to about ½" long. In articles molded from the compositions on the other hand, even shorter lengths will be encountered because, during compounding considerable fragmentation will occur. This is desirable, however, because the best properties are exhibited by thermoplastic injection molded articles in which the filament lengths lie between about 0.000005" and 0.125 (⅛").

The amount of flame-retardant additive should be present in an amount at least sufficient to reduce the flammability of the polyester resin, preferably to a UL94 V-0 rating. The amount will vary with the nature of the resin and with the efficiency of the additive. In general, however, the amount of additive will be from 2 to 20 percent by weight based on the weight of resin. A preferred range will be from about 5 to 15 percent.

Typically halogenated aromatic flame-retardants include tetrabromobisphenol A polycarbonate oligomer, polybromophenyl ether, brominated polystyrene, brorminated BPA polyepoxide, brominated imides, brominated polycarbonate, poly (haloaryl acrylate), poly (haloaryl methacrylate), or mixtures thereof. Poly (haloaryl acrylate) is preferred with the most preferably being poly (pentabromobenzyl acrylate). PBB-PA has been known for some time, and is a valuable flame-retardant material, useful in a number of synthetic resins. PBB-PA is prepared by the polymerization of pentabromobenzyl acrylate ester (PBB-MA). The PBB-PA polymeric flame-retardant material is incorporated into the synthetic resin during processing to impart flame retardant characteristics.

Examples of other suitable flame retardants are brominated polystyrenes such as polydibromostyrene and polytribromostyrene, decabromobiphenyl ethane, tetrabromobiphenyl, brominated alpha, omega-alkylene-bis-phthalimides, e.g. N,N'-ethylene-bis-tetrabromophthalimide, oligomeric brominated carbonates, especially carbonates derived from tetrabromobisphenol A, which, if desired, are end-capped with phenoxy radicals, or with brominated phenoxy radicals, or brominated epoxy resins. Other aromatic carbonate flame retardants are set forth in U.S. Pat. No. 4,636,544 to Hepp.

The flame retardants are typically used with a synergist, particularily inorganic antimony compounds. Such compounds are widely available or can be made in known ways. Typical, inorganic synergist compounds include $Sb_2O_5$; $SbS_3$; and the like. Especially preferred is antimony trioxide ($Sb_2O_3$). Synergists such as antimony oxides, are typically used at about 0.5 to 15, and more preferably from 1 to 6 percent by weight based on the weight percent of resin in the final composition.

Other ingredients employed in low amounts, typically less than 5 percent by weight of the total composition, include stabilizers, lubricants, colorants, plasticizers, nucleants, antioxidants and UV absorbers. These ingredients should be selected so as not to deleteriously affect the desired properties of the molded resin.

Although it is not essential, best results are obtained if the ingredients are precompounded, pelletized and then molded. Precompounding can be carried out in conventional equipment. For example, after predrying the polyester resin, other ingredients, and, optionally, other additives and/or reinforcements, a single screw extruder is fed with a dry blend of the composition. On the other hand, a twin screw extrusion machine can be fed with resins and additives at the feed port and reinforcement down stream.

Portions of the blend can be precompounded and then, extruded with the remainder of the formulation, and cut or chopped into molding compounds, such as conventional granules, pellets, etc. by standard techniques.

Distinct and secure marking can be carried out on the resin compositions of the present invention by means of laser irradiation.

EXAMPLES

The formulations shown below were preblended and extruded on a intermeshing-corotating twin-screw extruder at a die head temperature of 250° C. The extrudate was cooled through a water bath prior to pelletizing. Test parts were injection molded on a 3 oz. Engel molding press with a set temperature of approximately 240°–260° C. The resin was dried for 3–4 hours at 120 degrees Centigrade in a forced air circulating oven prior to injection molding.

The formulation of Examples 1 to 6 are particularly useful with a CO2 type laser which is used at 1064 nm. The ΔE is a measure of the total color change while ΔL is the light dark color change.

|  |  | Example 1 | Example 2 | Example 3 | Example 4 | Example 5 | Example 6 |
|---|---|---|---|---|---|---|---|
| PBT |  | 52.771 | 50.771 | 48.771 | 52.171 | 50.171 | 48.171 |
| glass fiber |  | 30 | 30 | 30 | 30 | 30 | 30 |
| FR package | antimony trioxide masterbatch | 3.5 | 3.5 | 3.5 | 3.5 | 3.5 | 3.5 |
|  | flame retardant | 10 | 10 | 10 | 10 | 10 | 10 |
|  | Teflon | 0.5 | 0.5 | 0.5 | 0.5 | 0.5 | 0.5 |
| PETS |  | 0.2 | 0.2 | 0.2 | 0.2 | 0.2 | 0.2 |
| Antioxidant 1076 |  | 0.15 | 0.15 | 0.15 | 0.15 | 0.15 | 0.15 |
| color package | blue dye | 0.062 | 0.062 | 0.062 | 0.062 | 0.062 | 0.062 |
|  | red pigment | 0.055 | 0.055 | 0.055 | 0.055 | 0.055 | 0.055 |
|  | blue pigment | 0.062 | 0.062 | 0.062 | 0.062 | 0.062 | 0.062 |
| mica |  |  | 2 | 4 |  | 2 | 4 |
| zinc phosphate |  |  |  |  | 0.6 | 0.6 | 0.6 |
| dE* |  | 0.99 | 1.28 | 1.52 | 1.01 | 1.31 | 1.7 |
| dL** |  | 0.63 | 0.86 | 0.96 | 0.57 | 0.61 | 1.07 |

*dE = color difference between lasered and non-lasered part (D65 illumination)
**dL = lightness differences between lasered and non-lasered part (D65 illumination)
Materials
PBT — PBT with Mw = 75000 (against PS standards) from GE Plastics
Glass fiber — Glass fiber OC R17B from Owens Corning
Antimony trioxide — Sb2O3/EVA masterbatch from PPC industries.
Flame retardant — FR1025P from Eurobrom BV
Teflon — Encapsulated Teflon from GE Plastics Europe
PETS, Pentaerythritol stearate, Loxiol EP8578 from Henkel
Antioxidant 1076 — Irganox 1076 from CIBA
Blue dye — Macrolex Blue RR from Bayer
Red pitment — Bayferrox 180 MPL from Bayter IP
White pigment — Sachtolith HDS from Sachtleben Chemie J.G.
Blue pigment — Heliogen Blue K6911D from BASF
Zinc phosphate — Delaphos Zinkfosfaat from Keyser & Mackay
Mica — Mica SPG20 from Aspanger

What is claimed is:

1. A resin composition having laser marking properties with the $CO_2$ laser with radiation at 10600 nm comprises a polyester thermoplastic resin, a sufficient amount of dark pigment for forming a dark background coloration, from about 1 to about 5 percent of said composition comprising a mica material for absorbing said laser radiation, and an effective amount of hydrated zinc phosphate containing wherein said zinc phosphate decomposes in laser struck areas to release said hydrated water whereby light colored markings in laser struck areas are obtained on said dark background coloration.

2. A resin composition having laser marking properties according to claim 1 wherein said mica is present in an amount from 2 to 4 percent by weight based on the total weight of the composition.

3. A resin composition having laser marking properties according to claim 1 wherein said mica is a complex potassium aluminum silicate.

4. A resin composition having laser marking properties according to claim 1 wherein said hydrated metal phosphate is a crystalline substance containing one or more molecules of water of crystallization capable of giving up its water of crystallization in the laser struck areas.

5. A resin composition having laser marking properties according to claim 1 wherein said polyester composition comprises structural units of the following formula:

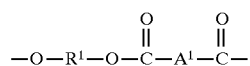

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof.

6. A resin composition having laser marking properties according to claim 1 additionally including reinforcing glass fibers.

7. A resin composition having laser marking properties according to claim 6 wherein said glass fibers comprise from 5 to 40 weight percent.

8. A molded article having laser radiated marked surface portions, said article comprises a polyester thermoplastic resin, a sufficient amount of dark pigment for forming a dark background coloration, from about 1 to about 5 percent of said composition comprising a mica material for absorbing said laser radiation, and an effective amount of zinc phosphate containing water of crystallization wherein said zinc phosphate decomposes in laser struck areas to release said water of crystallization whereby light colored markings in laser struck areas are obtained on said dark background coloration.

9. A molded article having laser marking properties according to claim 8 wherein said hydrated metal phosphate is a crystalline substance containing one or more molecules of water of crystallization capable of giving up its water of crystallization in the laser struck areas.

10. A molded article having laser marking properties according to claim 9 wherein said polyester composition comprises structural units of the following formula:

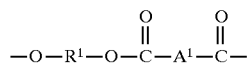

wherein each $R^1$ is independently a divalent aliphatic, alicyclic or aromatic hydrocarbon or polyoxyalkylene radical, or mixtures thereof and each $A^1$ is independently a divalent aliphatic, alicyclic or aromatic radical, or mixtures thereof.

11. A molded article having laser marking properties according to claim 9 additionally including reinforcing glass fibers.

12. A molded article having laser marking properties according to claim 9 wherein said fibrous glass comprises from 5 to 40 weight percent.

* * * * *